May 29, 1962 C. V. CROCKETT 3,036,869
BRAKE ACTUATING SYSTEM
Filed Sept. 9, 1957
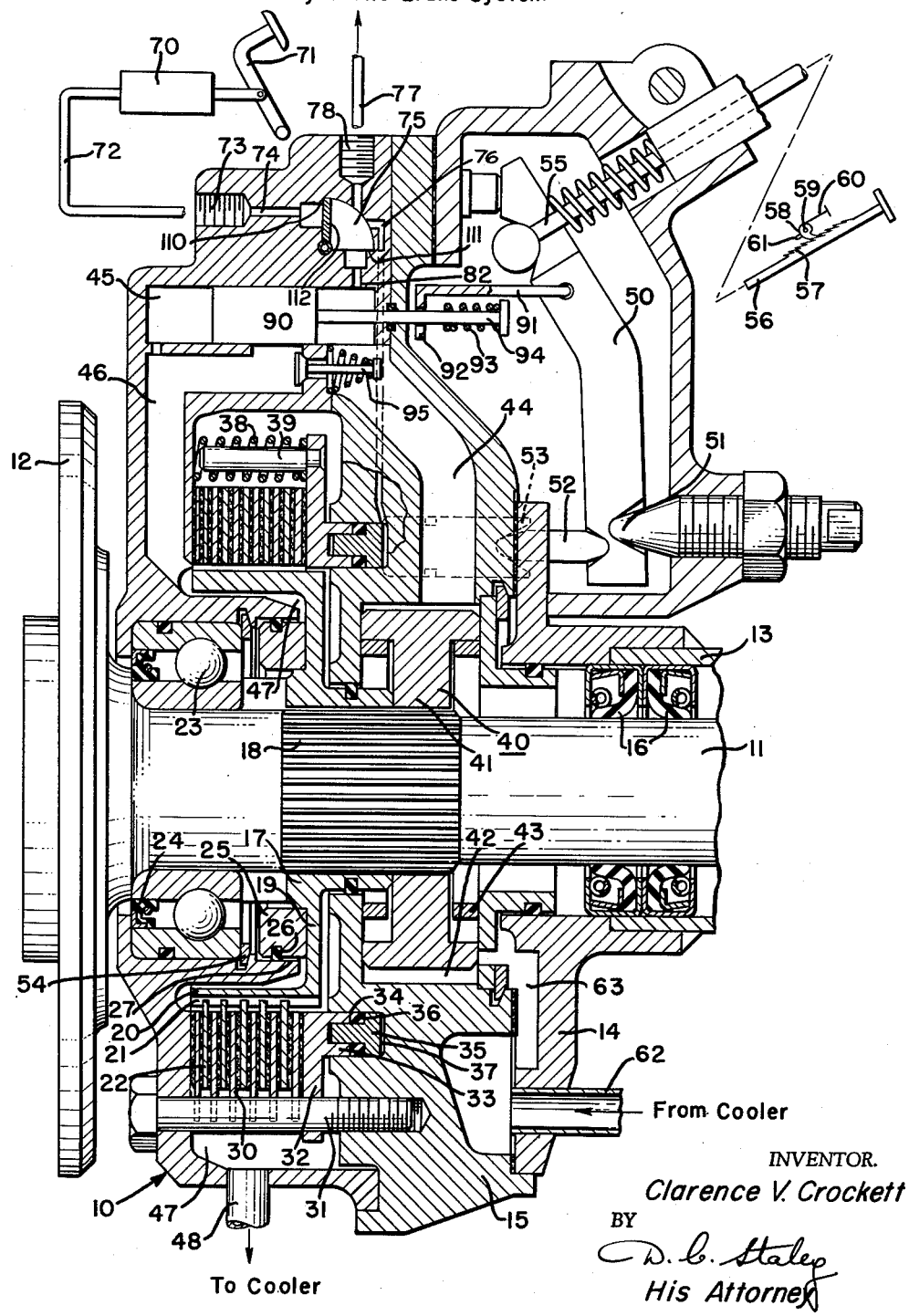
INVENTOR.
Clarence V. Crockett
BY
D. C. Staley
His Attorney

United States Patent Office 3,036,869
Patented May 29, 1962

3,036,869
BRAKE ACTUATING SYSTEM
Clarence V. Crockett, Pontiac, Mich., assignor to General Motors Corporation, Detroit, Mich., a corporation of Delaware
Filed Sept. 9, 1957, Ser. No. 682,745
4 Claims. (Cl. 303—2)

This invention relates to an actuating system for the brakes of a wheeled vehicle, and particularly to a system for actuating the friction brakes of a motor vehicle.

In this invention the brakes of the motor vehicle are of the multiple disk type wherein engagement of the disks effect a braking action for the vehicle, some of the disks being rotatable with the axles of the vehicle and other of the disks being stationary. The disk assembly, comprising alternate stationary and rotatable disks is adapted to be actuated by a hydraulically operated wheel cylinder that causes engagement of the disks for a brake operation. The wheel cylinder is connected with a master cylinder that is operated by the brake pedal of the vehicle to displace fluid from the master cylinder into the wheel cylinder to effect the braking operation.

The heat of friction created between the rotating and stationary disks of the brake is removed by circulation of a cooling liquid between the disks, or through the brake, a fluid pump being driven by the wheel axle to effect the circulation of cooling liquid through the brake and thence through a heat transfer device or cooler.

The pump for circulating the cooling liquid is preferably located within the rear wheel brakes of a vehicle and the pumps are adapted to circulate the cooling liquid through the rear wheel brakes and also through the front wheel brakes of the vehicle.

It is conventional to provide a mechanically operated parking or emergency brake on at least the rear wheels of a motor vehicle so that the wheel brakes having the mechanically operated parking brakes can be set to retain the vehicle in a stationary position. The manually operated mechanical mechanism is adapted to actuate the disk assembly to effect engagement of the disks and thereby provide for a parking brake, or an emergency manual operation of the disk assembly to stop the vehicle.

In this invention the liquid under pressure circulated by the pump for cooling the brake is utilized to provide for a power assist of the manually operated mechanical parking brake mechanism to thereby reduce the effort required to set the parking brake and to provide an hydraulic actuation of the disk brake assembly to effect primary braking with the mechanical parking brake mechanism providing a follow-up mechanism to the hydraulic mechanism to retain the disk brake in the position set by the cooperation of the hydraulic and mechanical mechanisms.

The foregoing operation of using the pressure fluid from the cooling pump is initiated and rendered effective by operation of the manually operated mechanical parking brake mechanism, a suitable valve being provided to cut off or resist the circulation of cooling liquid to the brake and thereby effect delivery of the pressure liquid to the wheel cylinder of the hydraulic brake and thereby hydraulically effect engagement of the disks of the brake as a power assist to the manually operated mechanical mechanism, the valve being actuated by actuation of the mechanical mechanism so that the hydraulic power assist occurs only when the parking brake mechanism is actuated.

The power assist of the manually operated mechanism also provides a more satisfactory operation of the parking brake mechanism when used for emergency stopping of the vehicle as the hydraulic power assist can be regulated according to the maximum pressure deliverable by the coolant circulating pump to obtain a controlled and predetermined liquid pressure to be applied to the wheel cylinder of the brakes. To regulate the maximum pressure to be applied to the wheel cylinders of the brakes by the coolant circulating pump, pressure actuated valve means are provided to provide for a release of coolant fluid from the output side of the pump into the brake when the maximum pressure of the control valve setting is reached, this occurring during a time when the manually operated mechanism is effecting a brake operation with power assist from the coolant pump.

The brake system is also arranged to utilize the hydraulic power assist from the coolant pump at any time a brake line should break somewhere between the brake and the master cylinder. A check valve is provided in the brake line between the master cylinder and the brake which closes when the pressure in the brake line is below the pressure in the discharge side of the coolant pump and thereby prevent loss of liquid from the coolant pump that is being delivered to the wheel cylinder for power assist of the manually operated mechanism.

Further objects and advantages of the present invention will be apparent from the following description, reference being had to the accompanying drawings wherein a preferred form of the invention is clearly shown.

In this invention the brake mechanism is illustrated as being applied to the rear axle of a motor vehicle. Preferably both rear wheel brakes are constructed and arranged as illustrated in the drawing with a positive displacement pump such as a gear or a vane type being provided to effect circulation of the cooling liquid through the brake and thence through a cooler or heat exchange device. The front wheel brakes are similar to the rear wheel brakes except that the coolant pump can be eliminated from the front wheel brake with the pumps in the rear wheel brakes providing for circulation of coolant through the front wheel brakes.

In the drawing, the brake 10 is supported upon the axle 11. The outboard end of the axle 11 has a flange 12 adapted to support a wheel. The axle 11 is contained within an axle housing 13 that has a flange 14 that supports the brake housing 15, the axle housing 13, the flange, and brake housing 15 being stationary components. Grease seals 16 are provided between the axle 11 and the axle housing 13 to prevent interchange of oil or grease between the brake and the differential of the vehicle.

The disk brake consists of a brake disk carrier 17 that is supported upon the axle 11 by means of the spline 18. The carrier has the radial wall 19 that terminates in the annulus 20 that has a plurality of teeth or splines 21 which in turn supports one or more brake disks 22. The brake disks 22 thus rotate with the axle 11. The axle 11 is journaled in the brake housing 10 by means of an anti-friction bearing 23, an oil seal 24 preventing loss of coolant oil from within the brake housing. The anti-friction bearing 23 is secured within the brake housing by means of the snap ring 54.

The brake disk carrier 17 supports a seal ring 25 that has a seal member 26 engaging the annular wall 27 of the brake housing that prevents loss of coolant fluid from within the brake housing.

Stationary brake disks 30 are positioned between the rotatable brake disks 22 and are supported upon a plurality of studs 31 which prevent their rotation. Either of the brake disks 30 or 22 have friction facings of any conventional type which facings are provided with grooves to allow circulation of cooling oil between the disks when the disks are in engagement with one another.

The brake disk assembly, comprising brake disks 22 and 30 are brought into engagement with one another by means of a pressure plate 32 that has an annular axial extending portion 33 positioned within an annular groove 34 provided in the brake housing 15. The annulus 33 carries an annular ring 35 that is T-shaped in transverse cross section, seal members 36 being provided between the ring 35 and the annulus 33. The space 37 between the bottom of the groove 34 and the ring 35 forms a chamber to receive hydraulic fluid under pressure from a master cylinder whereby to effect axial movement of the member 35 and the pressure plate 32 to cause pressure engagement of the brake disks 22 and 30. Retraction springs 38 are placed around the studs 39 and positioned between the pressure plate 32 and the wall of the housing 15 to provide for dis-engagement of the brake disks when the brake pedal is released.

To effect circulation of cooling liquid between the brake disks 22 and 30, a liquid pump 40 is carried on the spline 18 of the axle 11. In the drawing, the pump 40 is of a conventional vane type that has a rotor 41 carrying a plurality of radial vanes that engage the walls of the pump cavity 42, the rings 43 retaining the vanes in engagement with the outer wall of the pump cavity. While the pump 40 is specifically illustrated as being a vane type pump, yet other positive displacement pumps, such as a gear pump can be used.

The pump has its suction side connected with an inlet line 62 that comes from an oil cooler, or heat exchange device, the inlet line being connected with a suction chamber 63 from which the pump receives its liquid.

The pump 40 discharges liquid under pressure into the discharge passage 44 from which a liquid under pressure flows into a cylindrical chamber 45 and thence into a passage 46 that delivers the coolant liquid under pressure into the brake chamber 47. Coolant liquid flows between the brake disks 22 and 30 into the chamber 47 and exhausts through the outlet line 48 for return to the oil cooler or heat exchange device.

So long as the shaft 11 rotates, the positive displacement pump 40 will effect circulation of cooling liquid through the brake and between the brake and the heat exchange device.

It is conventional to provide a parking lever mechanism for actuating the brake in at least the rear wheels of the motor vehicle to retain the vehicle in a stationary position when the parking brake has been set. In this invention the parking or emergency lever mechanism consists of a lever arm 50 that is pivoted on a stud 51. A pin 52 extends between the lever arm 50 and a slidable plug 53 that engages the ring 35 of the wheel cylinder to actuate the ring 35 when the lever arm 50 is pivoted on the stud 51.

The upper end of the lever arm 50 is engaged by a cable 55 that extends from a pull lever mechanism 56 to effect setting of the brake when the pull mechanism 56 is actuated.

The mechanism 56 may be of any conventional type and is illustrated as consisting of a ratchet 57 engaged by a pawl 58 that prevents the ratchet 56 from moving in a left hand direction until the pawl 58 is rotated about its pivot 59 by lifting the member 60. A stop pin 61 prevents clockwise rotation of the pawl 58. Thus when the ratchet 57 is moved in a right hand direction the lever arm 50 will be rotated in a clockwise direction about the stud 51 to move the pin 52 in a left hand direction and thereby effect engagement of the brake disks 22 and 30.

A hydraulic actuating mechanism to effect engagement of the brake disks 22 and 30 consists of a conventional master cylinder 70 that is operated by a foot pedal 71. Fluid displaced by the master cylinder 70 is discharged under pressure into the brake line 72 which enters a port 73 in the brake housing 15. The port 73 is connected with a passage 74 that in turn is connected with a valve chamber 75. A passage 76 connects the valve chamber 75 with the chamber 37 of the wheel cylinder so that hydraulic liquid displaced by the master cylinder 70 will pass to the chamber 37 of the wheel cylinder and thereby effect engagement of the brake disks 22 and 30. A brake line 77 connected with the port 78 is adapted to connect other brakes of the vehicle with the valve chamber 75 for concurrent actuation of the other brakes at other wheels of the vehicle.

The valve chamber 75 contains a two-position valve 112 that fits on the inner end of the passage 75 and closes on a seat 111 against flow of hydraulic fluid in a left hand direction through the passage 74 but allows freedom of movement of the hydraulic fluid from the brake line 72 into the valve chamber 75.

The same valve 112 seats on seat 110 and connects the valve chamber 75 with the chamber 45 so that liquid under pressure from the pump 40 can flow from the chamber 45 into the valve chamber 75 and thence into the passage 76 for delivery to the wheel cylinder chamber 37 in a manner hereinafter described. The valve 112 prevents flow of hydraulic fluid from the valve chamber 75 into the chamber 45 when hydraulic fluid is being delivered into the chamber 75 from the master cylinder 70.

Thus there are two sources of hydraulic pressure for delivery to the wheel cylinder chamber 37, the first being the primary source from the master cylinder 70 and the second being from the pump 40. In the event the brake line 72 should break, fluid under pressure can be delivered from the pump 40 through the passage 82 and into the chamber 75 and thence through passage 76 to the wheel cylinder chamber 37 to effect hydraulic actuation of the brakes as an emergency measure.

To provide for delivery of fluid under pressure from the pump 40 into the wheel cylinder chamber 37 a valve member 90 comprising a piston slidable in the chamber 45 is adapted to have one position illustrated in the drawing to close off passage 46, or at least resist flow of fluid from the pump exhaust passage 44 into the passage 46. The valve piston 90 is adapted to be positioned in the position shown in the drawing by means of a link 91 connected with the lever arm 50 of the manually operated parking lever mechanism. This link 91 has a downwardly extending projection 92 that engages a spring 93 retained on a rod 94 that extends from the valve piston 90.

When the lever arm 50 is pivoted in a right hand direction about the stud 51, the extension 92 on the link 91 engages the spring 93 to prevent the piston valve 90 from moving in a left hand direction except against compression of the spring 93 so that liquid being discharged from the pump 40 will build up a sufficient pressure to exhaust through the port 82 into the valve chamber 75 for delivery into the wheel cylinder chamber 37. When the parking lever mechanism, or emergency lever mechanism is set in the position just described, hydraulic liquid under pressure from the pump 40 will give a hydraulic power assist to the action of the parking lever mechanism so that manual actuation of the plunger 53 to effect engagement of the brake disks 22 and 30 will be concurrently assisted by the hydraulic actuation of the piston ring 35 of the wheel cylinder.

To prevent pressure from going beyond a predetermined maximum value and thereby control the maximum hydraulic pressure to be applied from the pump 40 into the wheel cylinder chamber 37, a pressure operated by-pass valve 95 is provided between the passage 44 and the passage 46 to by-pass the piston valve 90 when it is retained in the position shown in the drawing.

When the parking lever mechanism is in the position illustrated in the drawing, the piston valve 90 can move freely in a left hand direction to open the passage 46 to the right hand end of the chamber 45 and thereby connect it with the passage 44 for free circulation of liquid delivered by the pump 40 for cooling of the brakes in a manner hereinbefore described.

While the form of embodiment of the invention as herein disclosed constitutes a preferred form, it is to be un-

What is claimed is as follows:

1. A brake actuating system for the brakes of a wheeled vehicle, comprising, friction brake means, first hydraulic means including wheel cylinder means actuating said brakes connected through conduit means with a master cylinder actuating said wheel cylinder means, second mechanical means actuating said brake means independently of said hydraulic means, pump means circulating cooling liquid through said brake means, valve means actuated by said mechanical means directing liquid flow from said pump means to said conduit means and said wheel cylinder means to actuate said brakes concurrently with actuation by said mechanical means, and other valve means in said conduit means closing off the conduit means to said master cylinder when the liquid pressure in the wheel cylinder from the pump is higher than the liquid pressure in the master cylinder.

2. A brake actuating system for the brakes of a wheeled vehicle, comprising, friction brake means, first hydraulic means including wheel cylinder means actuating said brakes connected through conduit means with a master cylinder actuating said wheel cylinder means, second mechanical means actuating said brake means independently of said hydraulic means, pump means circulating cooling liquid through said brake means, valve means actuated by said mechanical means directing liquid flow from said pump means to said conduit means and said wheel cylinder means to actuate said brakes concurrently with actuation by said mechanical means, and other valve means in said conduit means providing first for cutting off flow of liquid from the pump means to the wheel cylinder so long as pressure in the conduit means between the master cylinder and the wheel cylinder is above the pressure in the outlet side of the pump means and second for closing off the conduit means to said master cylinder when the liquid pressure in the wheel cylinder from the pump is higher than the liquid pressure in the conduit means between the master cylinder and the said other valve means.

3. A brake actuating system for the brakes of a wheeled vehicle, comprising, friction brake means, first hydraulic means including wheel cylinder means actuating said brakes connected through conduit means with a master cylinder actuating said wheel cylinder means, second mechanical means actuating said brake means independently of said hydraulic means, pump means circulating cooling liquid through said brake means, valve means in fluid flow circuit relationship between said pump means and said brake means having one position providing for flow of liquid from the pump means to the brake means for cooling said brake means and a second position restricting such flow, said valve means being connected with said mechanical means whereby to dispose said valve means in its said second position on actuation of said mechanical means to apply said brake means, and second valve means in said conduit means and providing communication between said master cylinder and said wheel cylinder in the first position, a second position providing communication between said first valve means to provide for delivery of liquid under pressure from said pump to said wheel cylinder when said first valve means is in its said second position.

4. A brake actuating system for the brakes of a wheeled vehicle, comprising, friction brake means, first hydraulic means including wheel cylinder means actuating said brakes connected through conduit means with a master cylinder actuating said wheel cylinder means, second mechanical means actuating said brake means independently of said hydraulic means, pump means circulating cooling liqud through said brake means, valve means in fluid flow circuit relationship between said pump means and said brake means having one position providing for flow of liquid from the pump means to the brake means for cooling said brake means and a second position restricting such flow, said valve means being connected with said mechanical means whereby to dispose said valve means in its said second position on actuation of said mechanical means to apply said brake means, second valve means in said conduit means and providing communication between said master cylinder and said wheel cylinder in the first position, a second position providing communication between said first valve means to provide for delivery of liquid under pressure from said pump to said wheel cylinder when said first valve means is in its said second position, and additional valve means in by-pass relation to said first valve means providing for flow of liquid from said pump to said brake means when pressure in the outlet side of the pump reaches a predetermined value with the said first valve means in its second position whereby to limit liquid pressure applied to said wheel cylinder from said pump.

References Cited in the file of this patent

UNITED STATES PATENTS

| 1,883,588 | Crane | Oct. 18, 1932 |
| 2,226,457 | Whittingham | Dec. 24, 1940 |
| 2,406,304 | Levy | Aug. 20, 1946 |
| 2,788,870 | Heck | Apr. 16, 1957 |

FOREIGN PATENTS

| 35,108 | Denmark | Sept. 24, 1925 |
| 505,513 | France | May 7, 1920 |